(12) United States Patent
Hafskjold et al.

(10) Patent No.: US 8,142,215 B2
(45) Date of Patent: Mar. 27, 2012

(54) HIGH-VOLTAGE ELECTRICAL CONNECTOR

(75) Inventors: Gunnar Hafskjold, Drammen (NO); Sigrid Aarbakke, Billingstad (NO)

(73) Assignee: Vetco Gray Scandinavia AS, Sandvika (NO)

( * ) Notice: Subject to any disclaimer, the term of this patent is extended or adjusted under 35 U.S.C. 154(b) by 32 days.

(21) Appl. No.: 12/743,943

(22) PCT Filed: Nov. 20, 2008

(86) PCT No.: PCT/IB2008/003156
§ 371 (c)(1),
(2), (4) Date: May 20, 2010

(87) PCT Pub. No.: WO2009/066159
PCT Pub. Date: May 28, 2009

(65) Prior Publication Data
US 2010/0248514 A1    Sep. 30, 2010

(30) Foreign Application Priority Data

Nov. 20, 2007   (NO) .................................. 20075968

(51) Int. Cl.
*H01R 4/60* (2006.01)
(52) U.S. Cl. ....................................................... 439/201
(58) Field of Classification Search .................. 439/201, 439/199, 138, 139, 271, 281; 417/422
See application file for complete search history.

(56) References Cited

U.S. PATENT DOCUMENTS

| 4,174,875 | A |   | 11/1979 | Wilson et al. |
|---|---|---|---|---|
| 5,209,673 | A | * | 5/1993 | Mohn et al. ................... 439/199 |
| 5,722,842 | A |   | 3/1998 | Cairns |
| 5,738,535 | A | * | 4/1998 | Cairns .......................... 439/138 |
| 7,074,064 | B2 |   | 7/2006 | Wallace |
| 7,097,515 | B2 | * | 8/2006 | Siddiqi et al. ................. 439/700 |
| 7,690,936 | B1 | * | 4/2010 | Snekkevik et al. ........... 439/281 |
| 7,832,503 | B2 | * | 11/2010 | Sand et al. .................... 175/107 |
| 7,857,604 | B2 | * | 12/2010 | Shaw et al. .................... 417/422 |
| 7,995,105 | B2 | * | 8/2011 | Lin ............................. 348/221.1 |
| 2002/0160640 | A1 | * | 10/2002 | Korpan et al. ................ 439/191 |

FOREIGN PATENT DOCUMENTS

| GB | 2198295 A | 6/1988 |
|---|---|---|
| GB | 2385009 A | 8/2003 |
| WO | WO-02/41336 A1 | 5/2002 |
| WO | WO-03/049834 A1 | 6/2003 |

OTHER PUBLICATIONS

PCT/ISA/210—International Search Report—Apr. 8, 2009.
PCT/ISA/237—Written Opinion of the International Searching Authority—Apr. 8, 2009.
Norwegian Search Report—May 29, 2008.

* cited by examiner

*Primary Examiner* — Alexander Gilman
(74) *Attorney, Agent, or Firm* — Venable LLP; Eric J. Franklin

(57) ABSTRACT

A method for volume compensation of a fluid-filled first chamber accommodating a first electrical appliance that is electrically connected by a high-voltage electrical connector to a second electrical appliance located in a fluid-filled second chamber. The first chamber is volume compensated to the second chamber via the electrical connector by a volume compensating arrangement integrated in the electrical connector. A high-voltage electrical connector with a volume compensating arrangement and an electrical assembly provided with such a connector.

18 Claims, 4 Drawing Sheets

HIGH-VOLTAGE ELECTRICAL CONNECTOR

CROSS-REFERENCE TO RELATED APPLICATIONS

This application claims priority to Norwegian patent application 20075968 filed 20 Nov. 2007 and is the national phase under 35 U.S.C. §371 of PCT/IB 2008/003156 filed 20 Nov. 2008.

FIELD OF THE INVENTION AND PRIOR ART

The present invention relates to a method for volume compensation of a fluid-filled first chamber provided with a first electrical appliance that is electrically connected by means of a high-voltage electrical connector to a second electrical appliance located in a fluid-filled second chamber. The invention also relates to a high-voltage electrical connector and an electrical assembly.

In the oil and gas industry where oil is extracted from one or more wells in an oil field, oil will be extracted together with water. The water has to be removed from the oil and this is mainly done by means of settling tanks in which the oil is permitted to settle under the action of gravity. However, stable oil-water emulsions may develop during the production of the oil. For example, the use of gas-liquid cyclones might contribute to a stable emulsion that will be difficult to separate only by means of settling. After having passed through, for example, a series of gravitational settling tanks, a certain amount of water normally remains in the oil in the form of droplets. In order to promote the separation of this remaining water content, which is difficult to separate from the oil only by means of further gravitational settling, different types of coalescing devices have been proposed taking advantage of the fact that water and oil have different permittivity.

It is well known to use electrostatic coalescing devices in order to achieve water droplet enlargement or coalescence of water in water-in-oil emulsions, whereupon the water can be separated more easily from the oil, e.g. by means of gravitational separation or the like. An electrostatic coalescing device can be employed to speed up the separation of any emulsion where the continuous phase is an electrical insulator, such as oil, and the dispersed phase has a different permittivity than said continuous phase. The dispersed phase may for instance be an electrical conductor, such as water. In an electrostatic coalescing device, an emulsion is subjected to an alternating current field or to a continuous or pulsed direct current field. Different types of electrostatic coalescing device are for instance disclosed in WO 03/049834 A1 and GB 2 385 009 A.

The electrical connector of the present invention is particularly, however not exclusively, intended to be used for electrically connecting a high-voltage transformer to a conductor of an electrostatic coalescing device, where the transformer is located in a chamber filled with a dielectric fluid and the conductor of the electrostatic coalescing device is located in another chamber filled with a dielectric fluid. When such an assembly is located in an environment where the dielectric fluid in said chambers are subjected to temperature variations, such as for instance when installed in a subsea gravitational settling tank, the volume of the dielectric fluid in the respective chamber may vary to such an extent due to temperature changes that there is a need to provide suitable means for volume compensation of the dielectric fluid in the respective chamber. The conventional solution is to provide each chamber with its own volume compensator so as to allow the dielectric fluid of an individual chamber to be volume compensated to the ambient medium via the volume compensator associated with the chamber in question.

SUMMARY OF THE INVENTION

The object of the present invention is to provide a new and advantageous manner of achieving volume compensation of a fluid-filled chamber in an electrical assembly.

According to the invention, this object is achieved by a method and a high-voltage electrical connector.

According to the inventive solution, a volume compensating arrangement is integrated in a high-voltage electrical connector designed to electrically connect a first electrical appliance located in a fluid-filled first chamber to a second electrical appliance located in a fluid-filled second chamber. The volume compensating arrangement of the high-voltage electrical connector is designed to allow said first chamber to be volume compensated to said second chamber via the high-voltage electrical connector. Thus, the first chamber can be volume compensated without requiring any separate volume compensator of conventional and normally rather bulky type. Hereby, the overall size of the electrical assembly comprising said first and second electrical appliances may be reduced. Furthermore, there is a risk that a leakage may arise in a conventional volume compensator and the risk of leakage between the first chamber and the surroundings is consequently reduced by dispensing with such a separate volume compensator for the first chamber.

High voltage is here to be understood as typically above 1 kV.

According to an embodiment of the high-voltage electrical connector of the present invention, the volume compensating arrangement of the electrical connector comprises one or several piston members for keeping the fluid in the first chamber separated from the fluid in the second chamber, said one or several piston members being displaceable under the effect of variations of the volume of the fluid in the first chamber so as to thereby allow such volume variations to be taken up by the fluid in the second chamber. Hereby, the first chamber is volume compensated to the second chamber in a simple and efficient manner.

Another embodiment of the high-voltage electrical connector of the present invention is characterized in:
that the electrical connector comprises a first connector part comprising a first casing and a first electrical contact member arranged inside this first casing;
that the electrical connector comprises a second connector part comprising a second casing and a second electrical contact member arranged inside this second casing, wherein the second connector part is connectable to the first connector part in such a manner that the second casing engages with the first casing in a fluid tight manner and the second contact member makes electrical contact with the first contact member when the second connector part is connected to the first connector part;
that the volume compensating arrangement comprises a first piston member, which is slidingly arranged inside the first casing and which forms a fluid tight barrier between a space on a first side of the first piston member and a space on the opposite side of the first piston member, the first contact member extending in a fluid tight manner through the first piston member; and
that the volume compensating arrangement comprises a second piston member, which is slidingly arranged inside the second casing and which forms a fluid tight barrier between a space on a first side of the second piston member and a space on the opposite side of the second piston member, the second contact member extending in a fluid tight manner through the second piston member.

This design of the electrical connector with two mutually connectable casings and a separate piston member in each casing will offer advantages with respect to the operation of connecting two electrical appliances of an electrical assembly by means of the electrical connector in question. These advantages will appear from the detailed description below.

Further advantages as well as advantageous features of the self-compensating high-voltage electrical connector of the present invention will appear from the following description.

The invention also relates to an electrical assembly.

BRIEF DESCRIPTION OF THE DRAWINGS

With reference to the appended drawings, a specific description of preferred embodiments of the invention cited as examples follows below. In the drawings.

DETAILED DESCRIPTION OF PREFERRED EMBODIMENTS OF THE INVENTION

Figure 1:
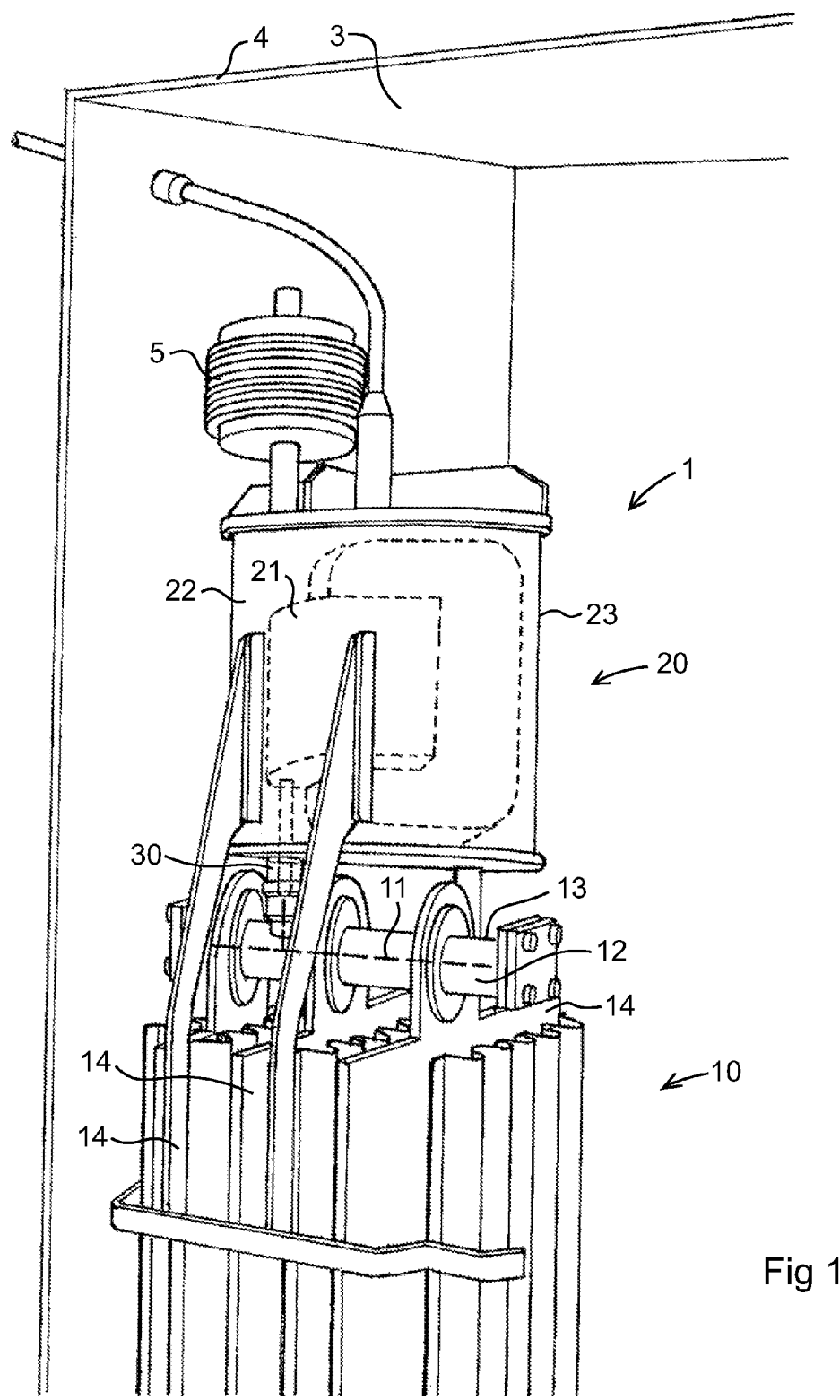
FIG. 1 is a schematic perspective view of a part of an electrical assembly provided with a high-voltage electrical connector according to an embodiment of the present invention.

A part of an electrical assembly 1 provided with an electrical connector 30 according to the present invention is illustrated in FIG. 1. The electrical assembly 1 comprises a first electrical appliance 11 located in a fluid-filled first chamber 12 and a second electrical appliance 21 located in a fluid-filled second chamber 22.

In the illustrated embodiment, the electrical assembly 1 comprises an electrostatic coalescing device 10 and a power supply unit 20 for supplying electric power to a number of sheet-shaped electrodes 14 of the electrostatic coalescing device. In this case:

the above-mentioned second electrical appliance 21 is a high-voltage transformer (illustrated in broken lines in FIG. 1) forming part of the power supply unit 20;

the above-mentioned second chamber 22 is the internal space of a transformer housing 23 accommodating the transformer 21;

the above-mentioned first electrical appliance 11 is a conductor (represented by a broken line in FIG. 1) for feeding electric power from the transformer 21 to the electrodes 14 of the electrostatic coalescing device 10; and the above-mentioned first chamber 12 is the internal space of a casing 13 accommodating the conductor 11.

The conductor 11, the casing 13 and the electrical connection between the conductor 11 and the electrodes 14 of the electrostatic coalescing device 10 are more closely described in the Norwegian patent application No. 20062419, the content of which being incorporated herein by reference. The conductor 11 may have the form of a rod of electrically conductive material, but it may alternatively have the form of a cable or a wire or the similar.

Said first and second chambers 12, 22 are filled with a dielectric fluid, such as oil. The first electrical appliance 11 is surrounded by the dielectric fluid of the first chamber 12 and second electrical appliance 21 is surrounded by the dielectric fluid of the second chamber 22.

The electrical appliance 11 in the first chamber 12 is electrically connected to the electrical appliance 21 in the second chamber 22 by means of the electrical connector 30, and the first chamber 12 is furthermore volume compensated to the second chamber 22 by means of a volume compensating arrangement 31 (see FIG. 2) integrated in the electrical connector 30. Thus, the first chamber 12 is volume compensated to the second chamber 22 via the electrical connector 30. The volume compensating arrangement suitably comprises one or several flexible membranes or slideable piston members, which are arranged to keep the fluid in the first chamber 12 separated from the fluid in the second chamber 22 and arranged to be influenced by variations of the volume of the fluid in the first chamber 12 so as to thereby allow such volume variations to be taken up by the fluid in the second chamber 22.

The second chamber 22 is in its turn volume compensated to the surroundings or to a third chamber. In the illustrated example, the electrical assembly 1 is located in a chamber 3 constituting the inner space of a gravitational settling tank 4 and the second chamber 22 is in this case volume compensated to this third chamber 3 by means of a volume compensator 5 in the form of an external expansion chamber of known type. The volume compensator 5 is arranged to equalize the pressure between the second chamber 22 and the third chamber 3.

A high-voltage electrical connector 30 according to a preferred embodiment of the present invention will in the following be described in closer detail with reference to FIG. 2.

The illustrated electrical connector 30 comprises:

a first connector part 100 with a casing 101 and an electrical contact member 102 arranged inside the casing;

a second connector part 200 with a casing 201 and an electrical contact member 202 arranged inside the casing; and a volume compensating arrangement 31 formed by components arranged inside the casings 101, 201 of said first and second connector parts 100, 200.

The first and second connector parts 100, 200 are connectable to each other and are so designed that the casing 201 of the second connector part engages with the casing 101 of the first connector part in a fluid tight manner and the contact member 202 of the second connector part makes electrical contact with the contact member 102 of the first connector part when the second connector part 200 is properly connected to the first connector part 100. In the illustrated example, the casing 201 of the second connector part 200 comprises an annular end section 203, which is receivable inside a corresponding annular end section 103 of the casing 101 of the first connector part 100. The external surface of the end section 203 and the internal surface of the end section 103 form mutual contact surfaces, which make contact with each other when the casings 101, 201 of the two connector parts are displaced axially into contact with each other. A sealing is suitably provided between the mutual contact surfaces of the casings 101, 201. In the illustrated example, said sealing is formed by two sealing members 204, 205 in the form of O-rings, which are spaced apart in the axial direction of the connector parts 100, 200 and arranged in annular grooves provided at an axial distance from each other in the external surface of the end section 203. An external flange 208 is arranged on the casing 201 of the second connector part in order to form a stop for the end section 103 of the other casing 101 when the casings of the two connector parts are axially displaced into contact with each other. The end section 103 is provided with an external thread 109, which co-operates with an internal thread 209 of a locknut 210. The locknut 210 surrounds the casing 201 of the second connector part and is axially slideable along this casing into contact with the external thread 109 of the end section 103 of the other casing 101 when the connector parts 100, 200 have been displaced into contact with each other. The external stop flange 208 of the casing 201 limits the axial displacement of the locknut 210 towards the outer end of the casing 201 by engagement with an internal flange 211 provided at the rear end of the locknut 210. When the casings 101, 201 of the two connector parts have been displaced into contact with each other, the locknut 210 is displaced towards the end section 203 of the casing 201 so as to come into contact with the external thread 109 of the end section 103 of the other casing 101. The locknut 210 is then tightened to the end section 103 so as to firmly secure the casings 101, 201 to each other. The internal space 32 enclosed by the casings 101, 201 when they are secured to each other is sealed from the surroundings by the sealing members 204, 205.

Figure 2:
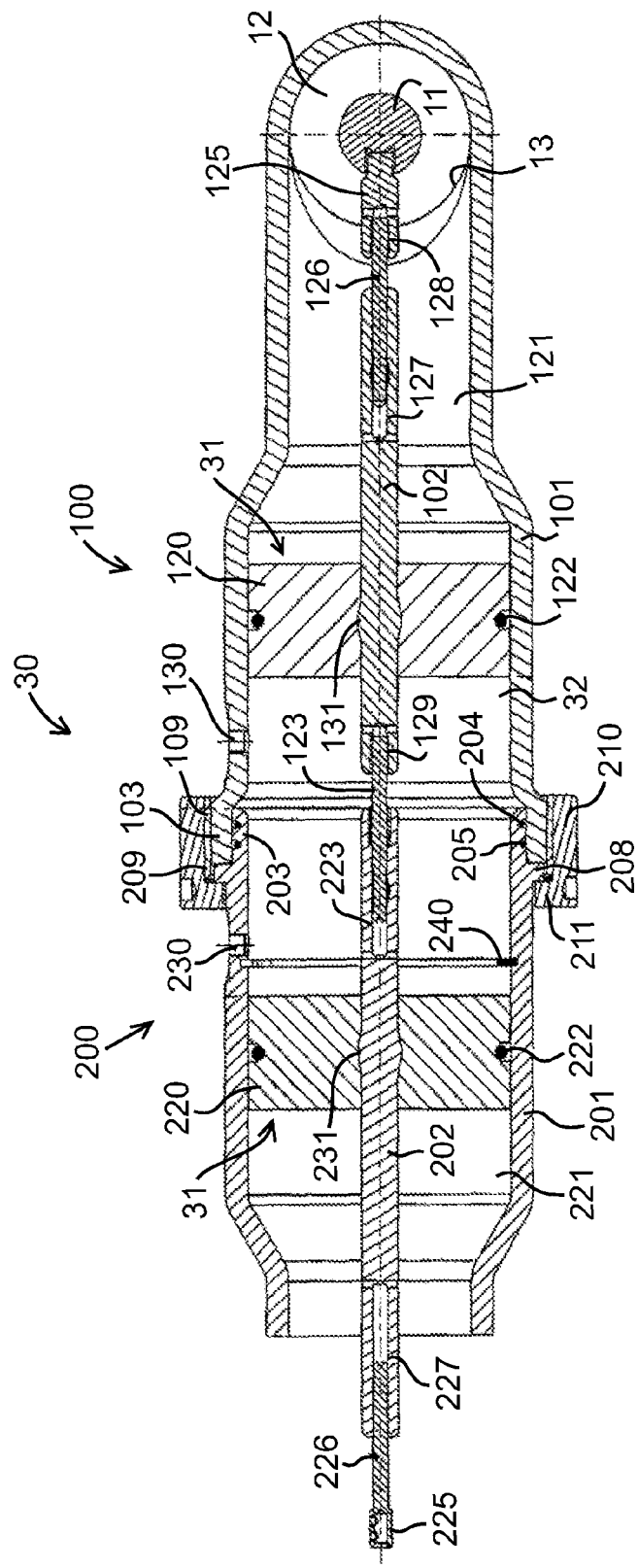
FIG. 2 is an illustration, in longitudinal section, of a high-voltage electrical connector according to a preferred embodiment of the present invention, as seen with two connector parts of the electrical connector connected to each other.

The contact members 102, 202 are of electrically conductive material and are preferably rod-shaped, as illustrated in FIG. 2.

The volume compensating arrangement 31 of the electrical connector 30 of FIG. 2 comprises:
  a first piston member 120, which is slidingly arranged inside the casing 101 of the first connector part and which forms a fluid tight barrier between a space 121 on a first side of the piston member 120 and a space on the opposite side thereof; and
  a second piston member 220, which is slidingly arranged inside the casing 201 of the second connector part and which forms a fluid tight barrier between a space 221 on a first side of the piston member 220 and a space on the opposite side thereof.

The space 121 in the casing 101 on the inner side of the first piston member 120 is in fluid communication with the above-mentioned first chamber 12, whereas the space 221 in the casing 201 on the inner side of the second piston member 220 is in fluid communication with the above-mentioned second chamber 22.

Each piston member 120, 220 is provided with at least one sealing member 122, 222 in the form of an O-ring or a QuadRing®, which is arranged in an annular groove provided in the envelop surface of the piston member. The piston members 120, 220 are preferably of electrically non-conductive material.

The contact member 102 of the first connector part extends in a fluid tight manner through a central hole in the first piston member 120 and the contact member 202 of the second connector part extends in a fluid tight manner through a central hole in the second piston member 220. Each piston member 120, 220 is fixedly secured to the associated contact member 102, 202 so that the contact member 102, 202 moves together with the piston member 120, 220 when the piston member slides in relation to the associated casing 101, 201. Thus, the contact member 102, 202 is prevented from sliding axially in relation to the associated piston member 120, 220. In the illustrated example, the respective contact member 102, 202 is fixed to the associated piston member 120, 220 by means of a bulge 131, 231, which is fitted into a corresponding recess provided at the middle of the through hole in the piston member 120, 220.

In the illustrated example, the contact member 102 of the first connector part comprises a male-shaped electrical contact element 123 in the form of a pin secured at the outer end of the contact member 102. This male-shaped contact element 123 fits slidingly into a corresponding female-shaped electrical contact element 223 provided at the outer end of the contact member 202 of the second connector part. The male-shaped contact element 123 extends into the female-shaped contact element 223 with such a length that it is capable of maintaining electrical contact with the female-shaped contact element 223 when the contact members 102, 202 move together with the respective piston member 120, 220 in relation to the casings 101, 201. The male-shaped contact element 123 may be provided with an external thread at its inner end so as to allow it to be secured by screwing to an internally threaded hole 129 provided at the outer end of the contact member 102.

At its inner end, the contact member 102 of the first connector part is electrically connected to an electrical conductor 125, which in its turn is electrically connected to the above-mentioned first electrical appliance 11. In the illustrated example, the electrical conductor 125 comprises a male-shaped electrical contact element 126 in the form of a pin secured at the outer end of the electrical conductor 125. This male-shaped contact element 126 fits slidingly into a corresponding female-shaped electrical contact element 127 provided at the inner end of the contact member 102. The male-shaped contact element 126 extends into the female-shaped contact element 127 with such a length that it is capable of maintaining electrical contact with the female-shaped contact element 127 when the contact member 102 moves together with the first piston member 120 in relation to the casing 101. The male-shaped contact element 126 may be provided with an external thread at its inner end so as to allow it to be secured by screwing to an internally threaded hole 128 provided at the outer end of the electrical conductor 125.

Figure 4:
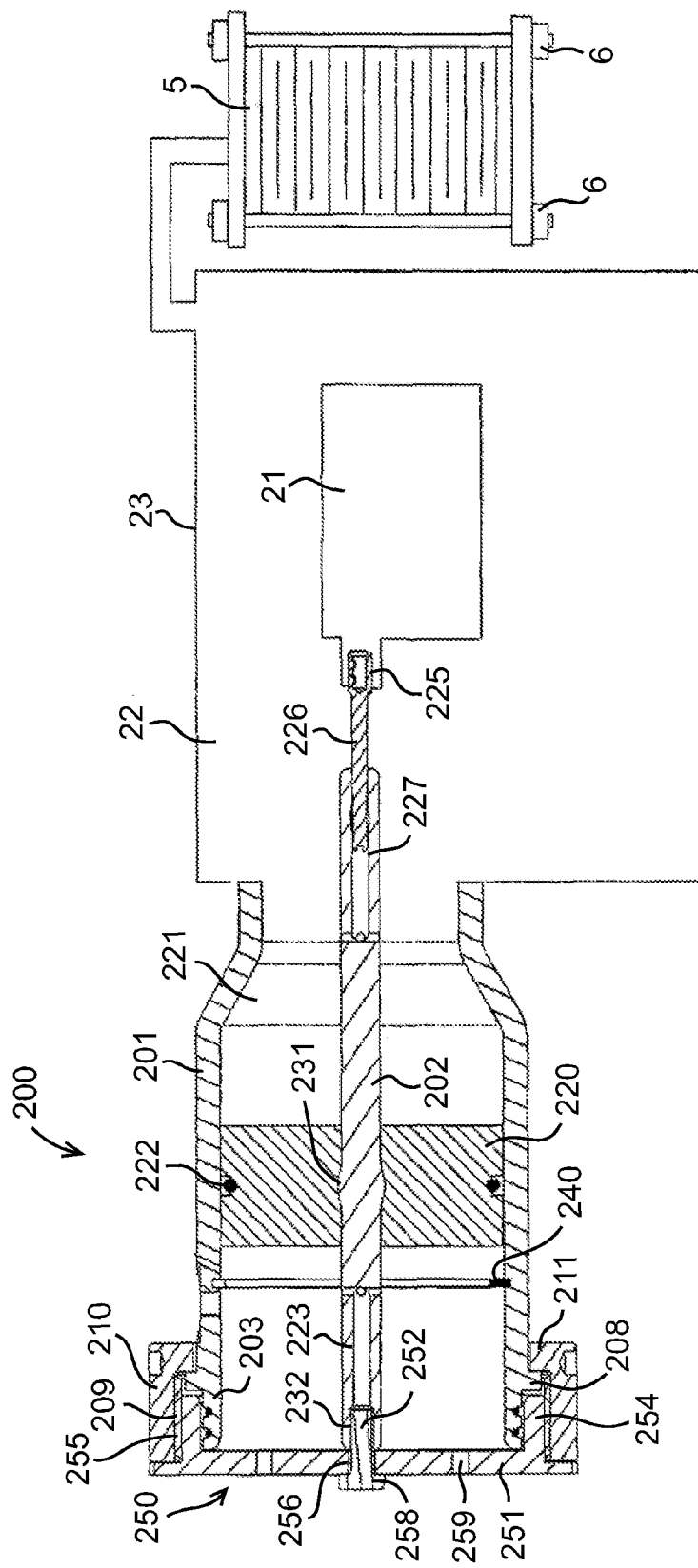
FIG. 4 is an illustration, in longitudinal section, of a second connector part of the electrical connector of FIG. 2, as seen before the connection to the other connector part.

At its inner end, the contact member 202 of the second connector part is electrically connected to an electrical conductor 225, which in its turn is electrically connected to the above-mentioned second electrical appliance 21. In the illustrated example, the electrical conductor 225 comprises a male-shaped electrical contact element 226 in the form of a pin. This male-shaped contact element 226 fits slidingly into a corresponding female-shaped electrical contact element 227 provided at the inner end of the contact member 202. The male-shaped contact element 226 extends into the female-shaped contact element 227 with such a length that it is capable of maintaining electrical contact with the female-shaped contact element 227 when the contact member 202 moves together with the second piston member 220 in relation to the casing 201. When the second electrical appliance 21 is a transformer, the electrical conductor 225 is connected to the transformer core, as schematically illustrated in FIG. 4.

A closable inlet opening 130 is arranged in one of the casings so as to allow dielectric fluid to be introduced through this inlet opening 130 into the chamber 32 formed between the piston members 120, 220 when the first connector part 100 is connected to the second connector part 200. When dielectric fluid is introduced into the chamber 32 via the inlet opening, air is allowed to escape from the chamber 32 via a closable outlet opening 230 arranged in one of the casings. The suitable locations of the inlet opening 130 and the outlet opening 230 depend on the intended orientation of the electrical connector 30 during the step of filling the chamber 32 between the piston members 120, 220 with dielectric fluid. The inlet opening 130 and outlet opening 230 are closed by means of suitable closing members (not shown), such as plugs or the similar, so as to prevent dielectric fluid from flowing out of the chamber 32.

The casing 101 of the first connector part 100 may be secured to the casing 13 of the first electrical appliance 11 by welding or formed in one piece with said casing 13. The casing 201 of the second connector part 200 may be secured to the housing 23 of the second electrical appliance 21 by welding or formed in one piece with said housing 23.

The process of interconnecting two electrical appliances 11, 21 by means of an electrical connector 30 according to the present invention will now be described with reference to FIGS. 3 and 4.

Figure 3:
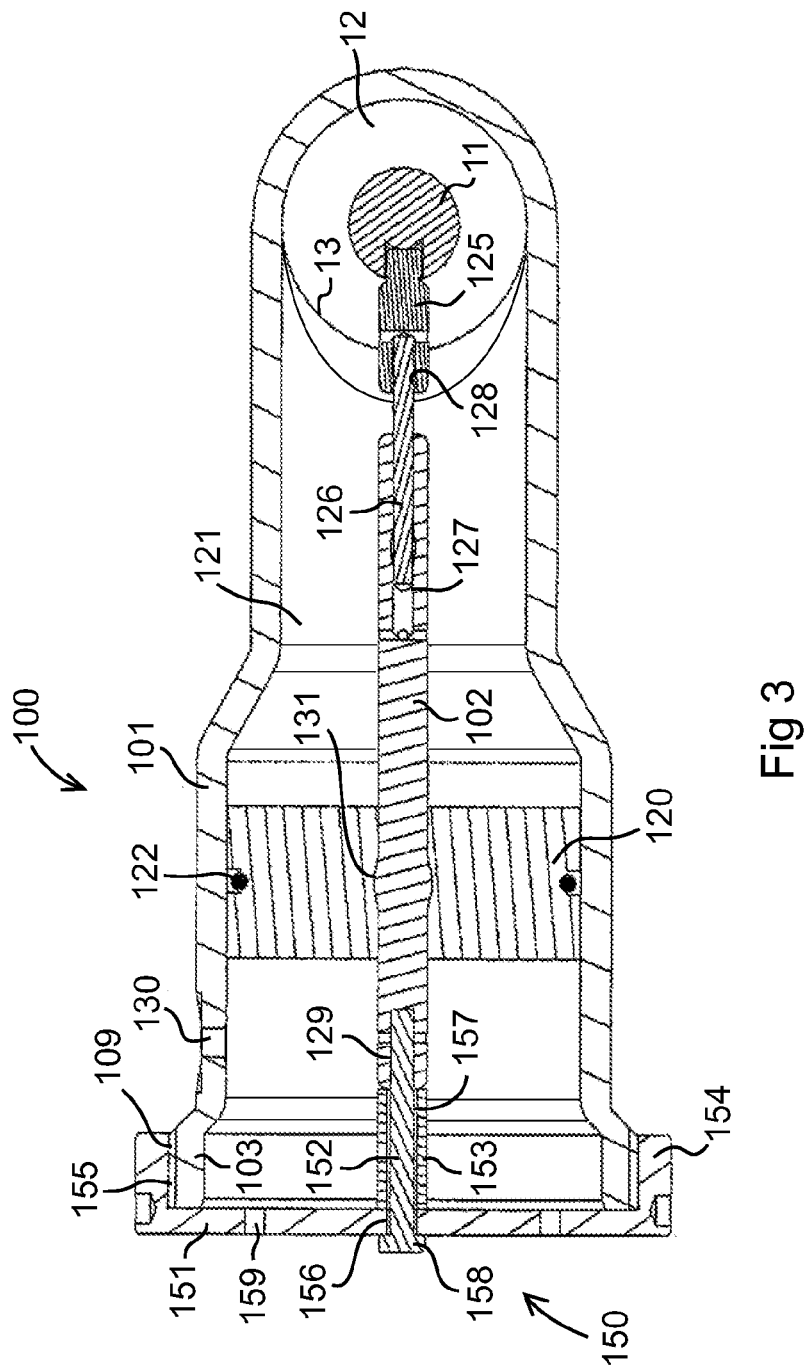
FIG. 3 is an illustration, in longitudinal section, of a first connector part of the electrical connector of FIG. 2, as seen before the connection to the other connector part.

When the first chamber 12 is to be filled with dielectric fluid, for instance in the form of oil, the first piston member 120 is first fixed at a given axial position inside the casing 101 of the first connector part 100 by means of a locking device 150 comprising a cover 151, a locking bolt 152 and a tubular spacing member 153, as illustrated in FIG. 3. The cover 151 is provided with a flange 154 having an internal thread 155, which fits to the external thread 109 of the end section 103 of the casing 101. Thus, the cover 151 is secured by screwing to the end section 103 of the casing 101. The locking bolt 152 extends through a central hole 156 in the cover 151 and through the axial bore 157 of the spacing member 153 and is secured by screwing to the internally threaded hole 129 provided at the outer end of the contact member 102. When the locking bolt 152 has been properly secured to the contact member 102, the head 158 of the locking bolt abuts against the outer side of the cover 151 and the spacing member 153 is clamped between the inner side of the cover and the outer end of the contact member 102. The spacing member 153 will secure that the piston member 120 is positioned at the intended axial position inside the casing 101. The proper positioning of the piston member 120 may be controlled by means of a suitable instrument via a hole 159 provided in the cover 151. The first chamber 12 is then filled with dielectric fluid and vacuumized, whereupon the locking device 150 is removed from the casing 101 so as to allow the piston member 120 to move in the axial direction of the casing 101 and compensate for changes in the volume of the dielectric fluid in the first chamber 12 caused by temperature variations.

When the second chamber 22 is to be filled with dielectric fluid, for instance in the form of oil, the second piston member 220 is first fixed at a given axial position inside the casing 201 of the second connector part 200 by means of a locking device 250 comprising a cover 251 and a locking bolt 252, as illustrated in FIG. 4. The cover 251 is provided with a flange 254 having an external thread 255, which fits to the internal thread 209 of the locknut 210. Thus, the cover 251 is secured by means of the locknut 210 to the end section 203 of the casing 201. The locking bolt 252 extends through a central hole 256 in the cover 251 and is secured by screwing to an internal thread 232 provided at the outer end of the female-shaped contact element 223. When the locking bolt 252 has been properly secured to the contact member 202, the head 258 of the locking bolt abuts against the outer side of the cover 251 and the outer end of the contact member 202 abuts against the inner side of the cover 251. The proper positioning of the piston member 220 may be controlled by means of a suitable instrument via a hole 259 provided in the cover 251. Furthermore, the volume compensator 5 connected to the second chamber 22 is locked in its neutral position before the filling of the second chamber 22. In the illustrated example, this locking of the volume compensator 5 is accomplished by means of locking bolts 6. The second chamber 22 is then filled with dielectric fluid and vacuumized, whereupon the locking bolts 6 of the volume compensator 5 are released so as to allow the volume compensator 5 to compensate for changes in the volume of the dielectric fluid in the second chamber 22 caused by temperature variations. The cover 251 and the locking bolt 252 are not to be removed until the moment when the second electrical appliance 21 is about to be electrically connected to the first electrical appliance 11 via the electrical connector 30, i.e. the moment when the two connector parts 100, 200 are to be interconnected.

When the second electrical appliance 21 is about to be electrically connected to the first electrical appliance 11, the male-shaped contact element 123 is screwed into the hole 129 at the outer end of the contact member 102 of the first connector part 100 and the volume compensator 5 is locked in its present position by means of its locking bolts 6. Subsequently, the cover 251 and the locking bolt 252 are removed from the casing 201 of the second connector part 200 so as to allow the second piston member 220 to move in the axial direction of the casing 201. The locking bolts 6 are mounted to the volume compensator 5 in such a manner that the pressure of the dielectric fluid in the second chamber 22 and thereby the position of the piston member 220 can be controlled by adjustment of the locking bolts 6. A retaining ring 240 mounted in a recess on the inner side of the casing 201 limits the axial displacement of the piston member 220 towards the outer end of the casing 201 and makes sure that the piston member is retained inside the casing. After the removal of the cover 251, the locking bolts 6 are adjusted so as to position the piston member 220 at a given axial position inside the casing 201. The first connector part 100 is then brought into contact with the second connector part 200, while allowing the male-shaped contact element 123 of the first connector part to slide into the corresponding female-shaped contact element 223 of the second connector part 200. Subsequently, the casing 101 of the first connector part is secured to the casing 201 of the second connector part by means of the locknut 210. The chamber 32 formed between the piston members 120, 220 is then filled with dielectric fluid, for instance in the form of oil, via the inlet opening 130, whereupon the inlet opening 130 and the outlet opening 230 are closed. Finally, the locking bolts 6 of the volume compensator 5 are released so as to allow the volume compensator 5 to compensate for changes in the volume of the dielectric fluid in the second chamber 22, whereas the piston members 120, 220 of the electrical connector compensate for changes in the volume of the dielectric fluid in the first chamber 12.

The invention is of course not in any way restricted to the embodiments described above. On the contrary, many possibilities to modifications thereof will be apparent to a person with ordinary skill in the art without departing from the basic idea of the invention such as defined in the appended claims. The electrical connector of the present invention could for instance be designed to interconnect other types of electrical appliances than here described.

The invention claimed is:

1. A method for volume compensation of a fluid-filled first chamber accommodating a first electrical appliance that is electrically connected by a high-voltage electrical connector to a second electrical appliance located in a fluid-filled second chamber, the method comprising:
 volume compensating the first chamber to the second chamber via the electrical connector utilizing a volume compensating arrangement integrated in the electrical connector.

2. The method according to claim 1, wherein the second chamber is volume compensated to a third chamber.

3. A high-voltage electrical connector for electrically connecting a first electrical appliance located in a fluid-filled first chamber to a second electrical appliance located in a fluid-filled second chamber, the high-voltage electrical connector comprising:
- a volume compensating arrangement integrated in the high-voltage electrical connector so as to allow the first chamber to be volume compensated to the second chamber via the electrical connector by this volume compensating arrangement.

4. The high-voltage electrical connector according to claim 3, wherein the volume compensating arrangement comprises one or several piston members for keeping the fluid in the first chamber separated from the fluid in the second chamber, said one or several piston members being displaceable under the effect of variations of the volume of the fluid in the first chamber so as to thereby allow such volume variations to be taken up by the fluid in the second chamber.

5. The high-voltage electrical connector according to claim 4, further comprising:
- a first connector part comprising a first casing and a first electrical contact member arranged inside the first casing; and
- a second connector part comprising a second casing and a second electrical contact member arranged inside the second casing, wherein the second connector part is connectable to the first connector part in such a manner that the second casing engages with the first casing in a fluid tight manner and the second contact member makes electrical contact with the first contact member when the second connector part is connected to the first connector part;
- wherein the volume compensating arrangement comprises a first piston member, which is slidingly arranged inside the first casing and which forms a fluid tight barrier between a space on a first side of the first piston member and a space on the opposite side thereof, the first contact member extending in a fluid tight manner through the first piston member; and
- wherein the volume compensating arrangement comprises a second piston member, which is slidingly arranged inside the second casing and which forms a fluid tight barrier between a space on a first side of the second piston member and a space on the opposite side thereof, the second contact member extending in a fluid tight manner through the second piston member.

6. The high-voltage electrical connector according to claim 5, wherein the contact members are rod-shaped.

7. The high-voltage electrical connector according to claim 5, wherein the piston members comprise electrically non-conductive material.

8. The high-voltage electrical connector according to claim 5, further comprising:
- a closable inlet opening arranged in one of the casings so as to allow dielectric fluid to be introduced through this inlet opening into the chamber formed between the piston members when the first connector part is connected to the second connector part.

9. The high-voltage electrical connector according to claim 5, wherein said casings are filled with a dielectric fluid.

10. The high-voltage electrical connector according to claim 9, wherein said casings are filled with oil.

11. The high-voltage electrical connector according to claim 5,
- wherein each piston member is fixedly secured to the associated contact member so that the contact member moves together with the piston member when the piston member slides in relation to the associated casing; and
- wherein the first and second contact members are designed so as to be capable of maintaining electrical contact with each other while being moved together with the respective piston member.

12. The high-voltage electrical connector according to claim 11, wherein one of said contact members comprises a male-shaped electrical contact element, which fits slidingly into a corresponding female-shaped electrical contact element of the other contact member.

13. The high-voltage electrical connector according to claim 12, wherein the male-shaped electrical contact element is in the form of a pin.

14. The high-voltage electrical connector according to claim 11, wherein each contact member at an inner end is electrically connected to an electrical conductor in such a manner that the contact member is capable of maintaining electrical contact with said electrical conductor while being moved together with the associated piston member.

15. The high-voltage electrical connector according to claim 14, wherein at least one of the contact members is connected to the associated electrical conductor via a male-shaped electrical contact element which fits slidingly into a corresponding female-shaped electrical contact element.

16. The high-voltage electrical connector according to claim 15, wherein both of the contact members are connected to the associated electrical conductor via a male-shaped electrical contact element, wherein the male-shaped electrical contact element is in the form of a pin.

17. An electrical assembly, comprising:
- a first electrical appliance located in a fluid-filled first chamber and
- a second electrical appliance located in a fluid-filled second chamber, and
- a high-voltage electrical connector, wherein the first electrical appliance is electrically connected to the second electrical appliance by the electrical connector, and wherein the first chamber is volume compensated to the second chamber by a volume compensating arrangement integrated in the electrical connector.

18. The electrical assembly according to claim 17, wherein the second electrical appliance is a high-voltage transformer, and wherein the first electrical appliance is a conductor for feeding electric power from the high-voltage transformer to one or several electrodes of an electrostatic coalescing device included in the electrical assembly.

* * * * *